LIMITER CIRCUIT

Filed April 28, 1958

INVENTOR.
CHARLES E. PETERSON
BY
F. A. Rechif
ATTORNEY

United States Patent Office 3,028,557
Patented Apr. 3, 1962

3,028,557
LIMITER CIRCUIT

Charles E. Peterson, Haddonfield, N.J., assignor to Radio Corporation of America, a corporation of Delaware Filed Apr. 28, 1958, Ser. No. 731,224
5 Claims. (Cl. 328—171)

Figures 1, 2:
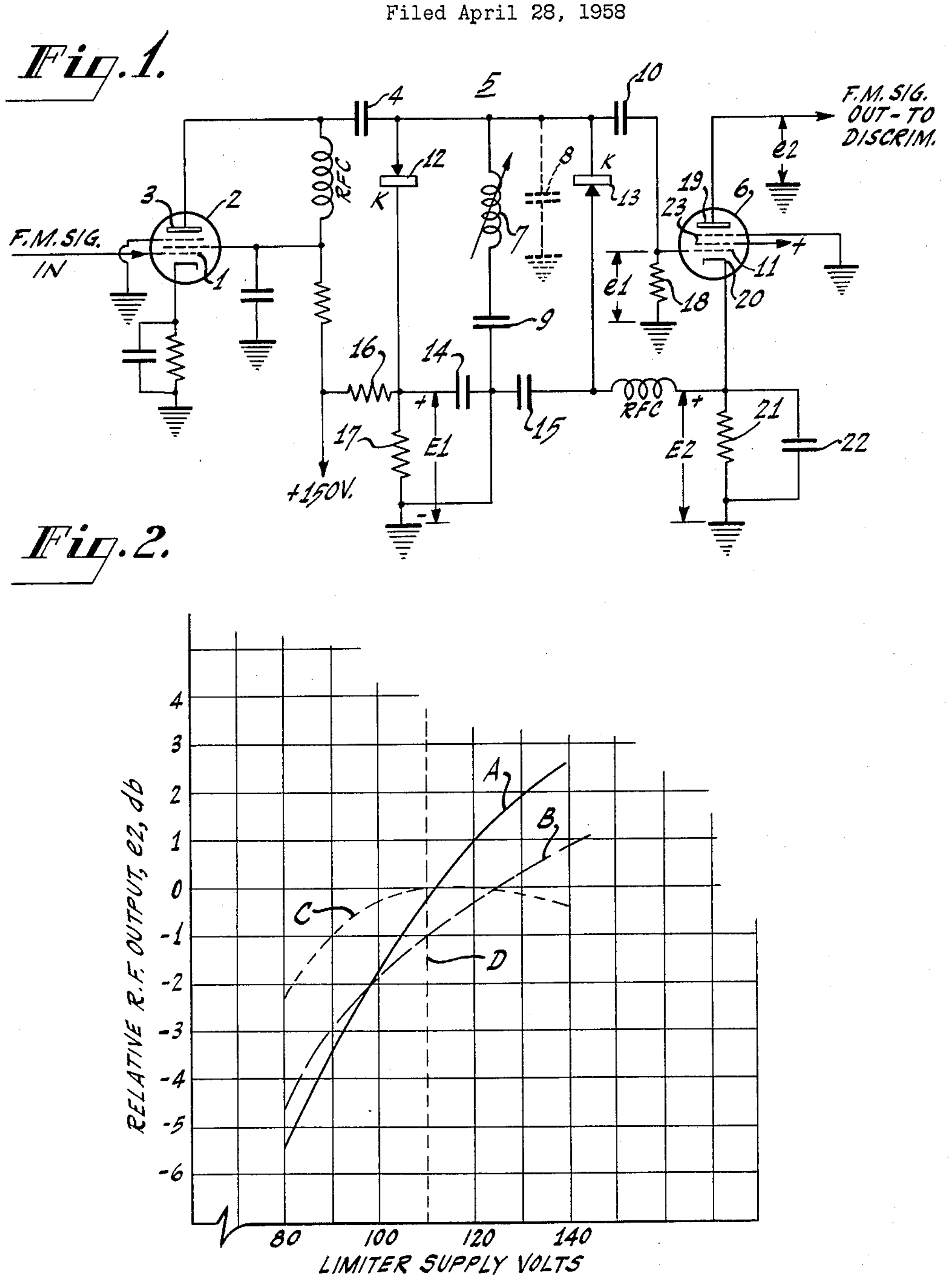

This invention relates to a limiter circuit useful in frequency modulation (FM) communications systems, and more particularly to a limiter useful in radio receivers which automatically compensates for changes of supply voltages and aging of electronic devices.

Many commonly used FM receivers include one or more limiter stages, followed by a discriminator. Most of the commonly used frequency discriminator circuits are sensitive to changes in the level of the radio frequency input thereto. Limiter circuits are used ahead of the discriminator for eliminating amplitude variations in the signal. As long as the radio frequency level fed to the limiter is above a certain threshold level, the discriminator output is substantially independent of the actual radio frequency level fed to the limiter.

A limiter circuit frequently used in wide-band FM receivers is one employing biased diodes connected across a single tuned circuit which is inserted betwen the output of one tube and the input of a second tube. The final limiter stage in an FM receiver is commonly connected to the input of an amplifier electron discharge tube the output of which is used to supply the discriminator. For convenience, this latter tube may be termed the discriminator driver tube.

In various applications of FM circuitry, it is desired to maintain the discriminator output constant over rather extended periods of time; for this, it would be necessary to maintain essentially constant the signal voltage applied to the discriminator. Among these applications may be mentioned unattended repeater stations in microwave relay systems (both to facilitate the addition of information at the repeater stations and to facilitate the operation of standby equipment when necessary), frequency deviation monitor circuits, and other FM test equipment. These applications present something of a problem. The output of the limiter circuit coupled to the input of the discriminator driver (amplifier) tube is essentially constant, provided the bias for the diodes is derived from a regulated voltage source. However, certain variations normally occurring in the action of the discriminator driver tube itself cause the signal voltage applied to the discriminator (i.e., the output of the driver tube) to vary, over a period of time. The gain of this tube is a function of the electrode voltages and the mutual conductance of the tube; in particular, for the pentodes usually used here, a variation of the screen grid voltage has a strong effect upon both the anode current and the mutual conductance of the tube (and hence also upon the output signal from this tube). In addition, aging of this discriminator driver tube causes the output signal therefrom to deteriorate or decrease in amplitude. Thus, from either or both of these causes, the signal voltage applied to the discriminator may vary considerably, over a period of time.

An object of this invention is to provide a new and improved limiter circuit.

Another object is to provide an arrangement for compensating a limiter circuit, such that even with changes of electrode (supply) voltages and aging of tubes, the output from the limiter (which is applied to a discriminator) remains essentially constant.

A detailed description of the invention follows, taken in conjunction with the accompanying drawing, wherein:

FIG. 1 is a circuit diagram of a limiter arranged according to this invention; and FIG. 2 is a set of curves illustrating the results obtained by the use of this invention.

First referring to FIG. 1, which represents a portion of the circuit of an FM receiver, a frequency modulated signal (derived from either a previous limiter stage or from a previous amplifier stage) is applied to the control grid 1 of a pentode vacuum tube 2 connected as an amplifier. Amplified output is taken from anode 3 of this tube and applied through a coupling capacitor 4 to a biased diode network indicated generally by the numeral 5. Network 5 is connected between the output of the first tube 2 and the input of a second pentode vacuum tube 6, which latter tube is an amplifier serving as the discriminator driver.

The limiter circuit or network 5, in addition to the biased diodes to be described hereinafter, includes a single tuned circuit inserted between the anode circuit of tube 2 and the control grid circuit of tube 6. This single tuned circuit comprises in essence an inductor 7 (variable for tuning or alignment purposes) having connected in parallel therewith a capacitor 8. Capacitor 8 may be made up of stray capacitance, as indicated by the dotted lines, or in some cases it may be an actual physical capacitor. The coupling between the lower ends of items 7 and 8 is completed by a D.C. isolating capacitor 9 which has negligible reactance at the operating frequency. The upper ends of items 7 and 8 are connected through a coupling capacitor 10 to the control grid 11 of tube 6, so it may be seen that the tuned circuit 7, 8 is connected across the signal-carrying path between the output of tube 2 and the input of tube 6. The signal-carrying path itself is made up principally of capacitors 4 and 10.

The network 5 includes also two diodes 12 and 13 which are connected across the tuned circuit 7, 8 and which when conductive short-circuit the signal-carrying path going to the input of the electron discharge device amplifier 6. These diodes are biased by a means to be described hereinafter, and constitute the principal or active parts of the limiter circuit of this invention. The diodes 12 and 13 are oppositely-arranged with respect to each other, so that one will conduct when the signal applied to the network 5 goes sufficiently positive and the other will conduct when the signal so applied goes sufficiently negative. More in particular, the anode of diode 12 is connected directly to the common junction of capacitors 4 and 10 or the upper ends of items 7 and 8, while the cathode of this diode is connected to ground through a capacitor 14 which has negligible reactance at the operating frequency.

One of the voltages determining the net reverse bias on diodes 12 and 13 is voltage E1 which is positive with respect to ground and is applied to the cathode of diode 12. Voltage E1 is fixed in value and is obtained from a source of voltage whose regulation is better than the desired regulation of the output voltage of tube 6; voltage E1 may therefore be considered a fixed source of bias voltage. Voltage E1 may be obtained from the +150 v. power supply by means of a voltage divider comprising two series-connected resistors 16 and 17 which are connected between the +150 v. terminal and ground, which latter is the negative terminal of the power supply; E1 is the voltage across resistor 17.

The output voltage of network 5 is the voltage $e1$ which is applied to the control grid 11 of amplifier tube 6; this voltage is the voltage which is applied by way of the signal-carrying path described to the input of amplifier 6. Voltage $e1$ appears across a resistor 18 which is connected from control grid 11 (and also from one side of capacitor 10) to ground.

The voltage $e1$ applied to the input of amplifier 6 is amplified therein, and the output of this amplifier appearing at anode 19 of tube 6 is the voltage *e*2, which is fed to a discriminator (not shown).

The anode 19 of tube 6 is connected to the positive terminal of a unidirectional voltage source through a suitable load resistor (not shown); the output voltage *e*2 is in effect the voltage developed across the aforesaid load resistor. The cathode 20 of tube 6 is connected to ground (or the negative terminal of the power supply) through a resistor 21 which is bypassed by a capacitor 22. Voltage E2, which is positive with respect to ground, is the voltage developed across resistor 21, that is, between the cathode end of this resistor and ground. The voltage E2 is a D.C. voltage which is a function of the current drawn by the tube 6 from the power supply, and specifically, is a direct function of the cathode current of this tube. The voltage E2 is applied through a choke RFC to the anode of diode 13.

The voltage E2 is isolated D.C.-wise from ground by the capacitor 15, just as the capacitor 14 isolates the voltage E1 from ground, D.C.-wise. It may be noted that the cathode of diode 13 and the anode of diode 12 are directly connected together, D.C.-wise, and that this common connection is isolated D.C.-wise from ground by the capacitor 9. With the diodes poled as illustrated and with the polarities of E1 and E2 as indicated, it may be seen that the voltages E1 and E2 are combined differentially, insofar as their biasing effect on the diodes is concerned. In other words, the net reverse bias for the diodes 12 and 13 is the difference between the two voltages, that is, this net bias is (E1−E2). To make the arrangement of the invention operate properly as a limiter, E1 must exceed E2 by the desired bias voltage, so that a net bias is applied to the diodes 12 and 13, in the reverse direction.

Now, suppose that the voltage applied to screen grid 23 of tube 6 varies in such a direction as to increase the anode current of this tube. The cathode current increases correspondingly, and this increase of cathode current flowing through resistor 21 increases the voltage E2. The net bias voltage ($E1-E2$) for the diodes will then decrease. The signal voltage *e*1 will decrease by the same proportion, since (as a result of the action of the biased diodes) the peak-to-peak level of *e*1 is approximately equal to the bias voltage ($E1-E2$). In this way, compensation is effected, because, when the increased anode current of tube 6 would normally tend to increase the output voltage *e*2, the drive voltage *e*1 to this tube is decreased in such a way that the output voltage *e*2 remains substantially constant.

For the usual pentode tubes which might be used at 6, an increase in cathode current (which, as previously stated, might be due to a variation in the screen grid voltage of this tube) will increase the mutual conductance of the tube, and the gain of the tube will increase in the same proportion. Hence, the overall effect (due to the increased cathode current, as previously described) is for *e*1 to drop or decrease as the anode current and mutual conductance rise, and *e*2 will remain substantially constant.

A similar compensating action occurs for a reduction or decrease in the anode current or the mutual conductance of tube 6. In this case, the cathode current of tube 6 decreases, resulting in a decrease of voltage E2 and an increase in the net bias voltage ($E1-E2$) for the diodes. The signal voltage *e*1 will then increase by the same proportion. Thus, when the decreased anode current of tube 6 would normally tend to decrease the output voltage *e*2, the drive voltage *e*1 to this tube is increased in such a way that the output voltage *e*2 remains substantially constant.

The circuit described also compensates for the aging of tube 6. As the cathode 20 becomes less active, the anode current and mutual conductance (and likewise, the cathode current) drop off or decrease. Then, the voltage E2 decreases, increasing the net bias voltage for the diodes and increasing the signal voltage *e*1. The circuit of the invention again tends to keep the output signal voltage *e*2 the same.

A circuit arrangement according to this invention has been built and successfully tested. In this constructed arrangement, the output of tube 6 was used to drive a discriminator circuit, the signal output of the discriminator being measured by a vacuum tube voltmeter circuit. The function of the overall circuit was to measure the peak deviation of a frequency modulated radio frequency carrier. Since the signal output of the discriminator circuit is dependent upon the level of the radio frequency voltage *e*2 at the anode 19, it was desired to keep this latter voltage constant.

Measurements were made on the overall system described, the results being plotted in FIG. 2. These tests were made by varying the voltage of the power supply used for the limiter, and taking corresponding readings on a vacuum tube voltmeter connected to the discriminator output. These readings were then converted to readings of the output voltage *e*2, on an arbitrary db scale. In FIG. 2, the solid-line curve A represents results obtained when the diode bias was derived only from the cathode bias voltage E2. The dashed-line curve B represents results obtained when the diode bias was derived only from the fixed source E1. The dotted-line curve C represents results obtained with the circuit of this invention, using a combination or resultant of the fixed and cathode voltages E1 and E2. It will be noted that the combination bias (illustrated by curve C) gives an output substantially independent of the electrode voltages on tube 6, and much more nearly constant than either fixed or cathode bias alone.

For a given type of tube at 6, the various voltages such as E1, E2 and the limiter supply voltage can be so chosen that the desired operating point falls in the flattest region of curve C. For example, the limiter supply voltage may be set at 110 volts, as indicated at D in FIG. 2. It should be remembered that the peak-to-peak level of *e*1 is approximately equal to the net bias voltage ($E1-E2$), so that *e*2 also depends upon E1 and E2. Therefore, attention should be paid to E1 and E2 when adjusting the circuit so that the desired operating point falls in the flattest region of curve C.

The following values for certain of the circuit components are given by way of example. These were the values used in a circuit built according to this invention and successfully tested.

| | | |
|---|---|---|
| Tube **2** | | 6CB6 |
| Tube **6** | | 6CB6 |
| Resistor **16** | ohms | 82,000 |
| Resistor **17** | do | 1,800 |
| Resistor **18** | do | 10,000 |
| Resistor **21** | do | 180 |
| Capacitor **4** | mmfd | 68 |
| Capacitor **9** | do | 1,000 |

What is claimed is:

1. A limiter circuit comprising a signal-carrying path connected to the input of an electron discharge device amplifier, two oppositely-arranged diodes each connected across said path, a source of fixed bias voltage, means for producing a unidirectional voltage whose amplitude is a direct function of the current drawn by said device, and connections for applying said voltages in series but opposed relation to said diodes, the resultant of said two voltages varying inversely with the current drawn by said device.

2. A signal translating circuit comprising a signal-carrying path connected to the input of an electron discharge device amplifier, two oppositely-arranged diodes each connected across said path, a source of fixed bias voltage, means for producing a unidirectional voltage whose amplitude is a direct function of the cathode current of said device, and connections for applying said voltages in series but opposed relation to said diodes, the resultant of said two voltages varying inversely with the cathode current of said device, and means for utilizing the output of said amplifier.

3. A limiter circuit comprising a signal-carrying path connected to the input of an electron discharge device amplifier, a first unidirectional current conducting device having an anode connected to said path and a cathode, a second unidirectional current conducting device having a cathode connected to said path and an anode, a source of fixed bias voltage having a positive terminal connected to the cathode of said first current conducting device, means including a resistor connected in the current conducting path of said amplifier for producing a unidirectional voltage whose amplitude is a direct function of the current drawn by said amplifier, means for coupling the relatively positive terminal of said resistor to the anode of said second current conducting device to apply said fixed voltage and said unidirectional voltage in series relation to said current conducting devices, whereby said fixed voltage and said unidirectional voltage are differentially combined to provide a reverse bias for said current conducting devices, the net reverse bias applied to said current conducting devices varying inversely with the current drawn by said amplifier.

4. A limiter circuit comprising a signal-carrying path connected to the input electrode of an amplifier device, a resistor connected between said input electrode and a point of reference potential, a first diode having an anode connected to said path and a cathode, a second diode having a cathode connected to said path and an anode, a source of fixed bias voltage having a positive terminal connected to the cathode of said first diode, a second resistor connected between a control electrode of said amplifier and said point of reference potential, means to couple the anode of said second diode to the junction of said second resistor and said control electrode, the amplitude of the unidirectional voltage developed across said second resistor and applied to the anode of said second diode being a direct function of the current drawn by said amplifier, whereby said fixed voltage and said unidirectional voltage are differentially combined to provide a reverse bias for said diodes, the net reverse bias applied to said diodes varying inversely with the current drawn by said amplifier.

5. A limiter circuit as claimed in claim 4 and wherein a tuned circuit is coupled between said point of reference potential and the junction of the anode of said first diode and the cathode of said second diode.

References Cited in the file of this patent

UNITED STATES PATENTS

| | | |
|---|---|---|
| 2,144,995 | Pulvari-Pulvermacher | Jan. 24, 1939 |
| 2,215,777 | Benz | Sept. 24, 1940 |
| 2,247,324 | Travis | June 24, 1941 |
| 2,340,429 | Rankin | Feb. 1, 1944 |
| 2,390,502 | Atkins | Dec. 11, 1945 |
| 2,434,929 | Holland et al. | Jan. 27, 1948 |
| 2,548,668 | Hadfield | Apr. 10, 1951 |
| 2,554,905 | Hawkins et al. | May 29, 1951 |
| 2,572,900 | Winkler | Oct. 30, 1951 |
| 2,617,019 | Hepp | Nov. 4, 1952 |
| 2,703,382 | Cleary | Mar. 1, 1955 |
| 2,823,275 | Ault | Feb. 11, 1958 |
| 2,892,080 | Chauvin et al. | June 23, 1959 |
| 2,906,871 | Crawford | Sept. 29, 1959 |